US008744438B2

(12) United States Patent
Lindoff et al.

(10) Patent No.: US 8,744,438 B2
(45) Date of Patent: Jun. 3, 2014

(54) CELL SEARCH METHOD FOR MULTI-MODE TELECOMMUNICATION APPARATUS, SUCH APPARATUS, AND COMPUTER PROGRAM FOR IMPLEMENTING THE METHOD

(75) Inventors: Bengt Lindoff, Bjärred (SE); Johan Nilsson, Höllviken (SE); Torgny Palenius, Barsebäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 636 days.

(21) Appl. No.: 12/745,259

(22) PCT Filed: Nov. 27, 2008

(86) PCT No.: PCT/EP2008/066356
§ 371 (c)(1),
(2), (4) Date: Oct. 31, 2010

(87) PCT Pub. No.: WO2009/068620
PCT Pub. Date: Jun. 4, 2009

(65) Prior Publication Data
US 2011/0034168 A1 Feb. 10, 2011

Related U.S. Application Data

(60) Provisional application No. 60/991,661, filed on Nov. 30, 2007.

(30) Foreign Application Priority Data

Nov. 29, 2007 (EP) .................................. 07121877

(51) Int. Cl.
*H04W 4/00* (2009.01)
*H04W 36/14* (2009.01)
*H04W 36/24* (2009.01)

(52) U.S. Cl.
CPC .............. *H04W 36/14* (2013.01); *H04W 36/24* (2013.01); *H04B 2201/70702* (2013.01)
USPC ............ 455/434; 455/428; 370/203; 370/335

(58) Field of Classification Search
CPC ................. H04W 36/14; H04W 36/24; H04B 2201/70702; H04L 2027/0065
USPC ...................... 455/434, 436–444, 552.1, 428; 370/329, 203, 335; 709/217
See application file for complete search history.

(56) References Cited

U.S. PATENT DOCUMENTS 5,950,127 A * 9/1999 Nitta et al. .................... 455/428
7,672,277 B2 * 3/2010 Qiao ............................. 370/335
(Continued)

FOREIGN PATENT DOCUMENTS

CN 101072439 A 11/2007

OTHER PUBLICATIONS

PCT International Search Report, dated Feb. 27, 2009, in connection with International Application No. PCT/EP2008/066356.
(Continued)

*Primary Examiner* — Mahendra Patel
(74) *Attorney, Agent, or Firm* — Leffler Intellectual Property Law, PLLC

(57) ABSTRACT

A cell search method for a multi-mode telecommunication apparatus is disclosed. The method comprises receiving signals present in a frequency range; transforming received signals into frequency domain; estimating power spectral density from transformed signals; estimating probability of different communication modes by correlating the estimated power spectral density with power spectral density signatures of said different communication modes; and performing cell search according to estimated most probable communication mode. Such an apparatus and a computer program for performing the method are also disclosed.

15 Claims, 6 Drawing Sheets

(56) References Cited

U.S. PATENT DOCUMENTS

| | | | |
|---|---|---|---|
| 8,228,849 B2* | 7/2012 | Trachewsky | 370/329 |
| 2004/0116110 A1* | 6/2004 | Amerga et al. | 455/422.1 |
| 2006/0009216 A1 | 1/2006 | Welnick et al. | |
| 2007/0091785 A1 | 4/2007 | Lindoff et al. | |
| 2009/0017823 A1* | 1/2009 | Sachs et al. | 455/437 |
| 2010/0222055 A1* | 9/2010 | Cho et al. | 455/434 |

OTHER PUBLICATIONS

PCT International Preliminary Report on Patentability, mailed Jun. 10, 2010, in connection with International Application No. PCT/EP2008/066356.

Chinese Office Action, dated Jul. 4, 2012, in connection with counterpart Chinese Application No. 2008 80118334.1.

English translation of Chinese Office Action, dated Jul. 4, 2012, in connection with counterpart Chinese Application No. 2008 80118334.1.

Chinese Search Report, dated Jul. 4, 2012, in connection with counterpart Chinese Application No. 2008 80118334.1.

English translation of Chinese Search Report, dated Jul. 4, 2012, in connection with counterpart Chinese Application No. 2008 80118334.1.

* cited by examiner

CELL SEARCH METHOD FOR MULTI-MODE TELECOMMUNICATION APPARATUS, SUCH APPARATUS, AND COMPUTER PROGRAM FOR IMPLEMENTING THE METHOD

CROSS-REFERENCE TO RELATED APPLICATIONS

This application claims priority under 35 U.S.C. §119 to European Patent Application No. 07121877.0 filed Nov. 29, 2007, which is hereby incorporated herein by reference in its entirety. This application also claims the benefit of U.S. Provisional Application No. 60/991,661, filed Nov. 30, 2007, which is hereby incorporated herein by reference in its entirety.

TECHNICAL FIELD

The present invention relates to a cell search method for a multi-mode telecommunication apparatus, such an apparatus, and a computer program for implementing the method.

BACKGROUND

Traditionally, a telecommunication apparatus were designed to work in one communication mode, which was assigned a particular frequency range in which only signals belonging to that communication mode was present. This has evolved to telecommunication apparatuses able to work within more than one communication mode, where each communication mode has its predetermined and well-known frequency range. However, a multi-mode telecommunication apparatus that is to connect to a telecommunication system where a plurality of communication modes is present may face a signal environment where it is frequency bands that have operation for several communication modes. Here, the number of combinations of carrier frequencies and communication modes in a desired or possible frequency range for operation becomes large, which makes initial synchronization time long and power consuming.

According to one prior art approach of dealing with this, which is disclosed in US 2007/0091785 A1, the search is based on information in a history list. The history list includes frequency ranges and bandwidths that have been used before.

Another approach is disclosed in US 2006/0009216 A1, in which a scan list is modified to remove all non-current-mode systems and sequentially scanning a highest priority channel on the modified scan list. If a communication device has recently found service on a particular system in a first mode, the communication device will only search for systems that are associated with that first mode.

A problem still to be solved is thus to cope with first time synchronization, or when the signal environment has changed significantly, e.g. switching on the communication apparatus in a new geographical situation.

SUMMARY

The present invention is based on the understanding that coming communication systems will comprise a plurality of communication modes which have to be dealt with in an efficient manner to be able to perform efficient cell search. The invention is further based on the understanding that identification of present communication modes can be performed by recognising signal patterns associated with the communication modes, and that this can be performed by regarding the signals in frequency domain.

According to a first aspect of the present invention, there is provided a cell search method for a multi-mode telecommunication apparatus, the method comprising receiving signals present in a frequency range; transforming received signals into frequency domain; estimating power spectral density from transformed signals; estimating probability of different communication modes by correlating the estimated power spectral density with power spectral density signatures of said different communication modes; and performing cell search according to estimated most probable communication mode.

An advantage of this is faster and less power consuming cell search where a multitude of communication modes are present. A further advantage is that the method utilizes basic functions that a normal multi-mode telecommunication apparatus is capable of with no or few hardware additions.

The signals may be modulated radio frequency signals that are wirelessly received. The signals may be converted to digital form on reception to enable digital signal processing. Transforming may be FFT, DFT, DCT, etc. Power spectral density is a positive real function of a frequency variable associated with a stationary stochastic process, or a deterministic function of time, which has dimensions of power per Hz, or energy per Hz. Power spectral density signatures of said different communication modes may be stored based on what communication modes the apparatus is capable of. Cell search may be performed according to prior art for each determined communication mode.

The method may further comprise ranking said different communication modes according to their estimated probability; and if no cell search match is found on the most probable communication mode, performing cell search for the other different communication modes in order of decreasing probability. This may be performed until a cell search match is found, or until a reasonable probability lower threshold is reached, below which probability for finding a cell is considered not worth spending cell searching capacity. An advantage of this is further streamlining of cell search in a way that gives a good chance of finding a proper cell quickly and with low power investment.

The estimation of power spectral density from transformed signals may comprise averaging over a time corresponding to a predetermined number of expected symbols for any of the communication modes. The estimation of power spectral density from transformed signals may further comprise averaging over a predetermined number of expected carriers for any of the communication modes. This further facilitates estimation of the probability estimation since the estimated PSD will be in a shape that is easier compared to the PSD signatures of the different communication modes.

The method may further comprise determining received signal strength indicator, RSSI, for the received signals. Here, it should be noted that RSSI may be determined for a certain bandwidth, or that several RSSI values may be determined over a certain bandwidth, such as an RSSI scan. The method may further comprise continuing the receiving of signals, if the RSSI is below a predetermined threshold, until the RSSI becomes above the predetermined threshold before performing said transforming, estimating power spectral density, estimating probability, and cell searching. The threshold should take account on the way, as demonstrated above, that the RSSI was determined. The method may further comprise determining frequencies holding peaks of power, wherein said correlation of estimated power spectral density with power spectral density signatures of said different communication modes is performed for frequency values on and in vicinity of said frequencies holding peaks of power. The cell search according to estimated most probable communication mode may be performed on and in vicinity of said frequencies holding peaks of power. These features each provide further streamlining of cell searching by avoiding performing cell search on signals that have low likelihood to represent a proper telecommunication mode signal.

According to a second aspect of the present invention, there is provided a multi-mode telecommunication apparatus comprising a radio receiver arranged to receive signals present in a frequency range; a transformer means arranged to transform signals received by the radio receiver into frequency domain; a power spectral density estimator arranged to estimate power spectral density of signals transformed by the transformer; a probability estimator arranged to estimate probability of different communication modes, said probability estimator comprising a correlator arranged to correlate the estimated power spectral density with power spectral density signatures of said different communication modes; a plurality of cell searchers, each arranged to perform cell searching for a communication mode; and a controller arranged to assign the one of said plurality of cell searchers to perform cell search according to the estimated most probable communication mode.

The controller may further be arranged to rank said different communication modes according to their estimated probability, and if no cell search match is found on the most probable communication mode, arranged to assign another of said plurality of cell searchers to perform cell search for another different communication modes in order of decreasing probability. The controller may be arranged to perform this until a cell search match is found, or until the probability is below a reasonable threshold.

The power spectral density estimator may comprise averaging means arranged to provide an average over a time corresponding to a predetermined number of expected symbols for any of the communication modes. The averaging means may further be arranged to average over a predetermined number of expected carriers for any of the communication modes.

The apparatus may further comprise received signal strength indicator, RSSI, determination means arranged to provide RSSI for the received signals. The controller may further be arranged to control the receiving of signals to continue, if the RSSI is below a predetermined threshold, until the RSSI becomes above the predetermined threshold before activating said transformer, power spectral density estimator, probability estimator, and any of the cell searchers. The controller may further be arranged to determine frequencies holding peaks of power, such that said correlator is controlled to perform said correlation of estimated power spectral density with power spectral density signatures of said different communication modes for frequency values on and in vicinity of said frequencies holding peaks of power. The assigned cell searcher controlled to perform cell searching according to estimated most probable communication mode may be controlled to perform cell searching on and in vicinity of said frequencies holding peaks of power.

According to a third aspect of the present invention, there is provide a computer program comprising instructions, which when executed by a processor are arranged to cause the processor to perform the method according to the first aspect of the present invention.

Advantages of second and third aspects of the present invention are similar to those demonstrated for the first aspect of the present invention.

DETAILED DESCRIPTION

Figure 1A:
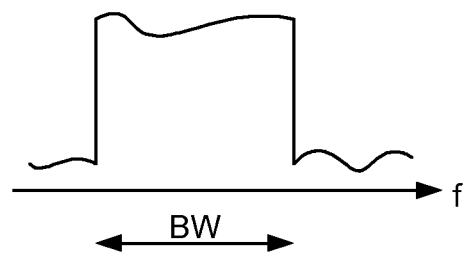
FIGS. 1a and 1b illustrate exemplary PSD that an OFDM communication mode may show.
Figure 1B:
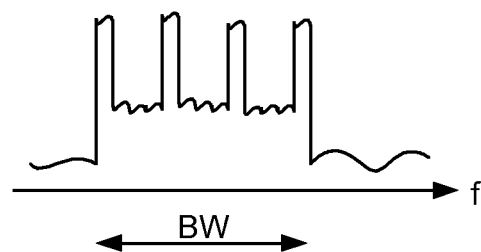
Figure 1C:
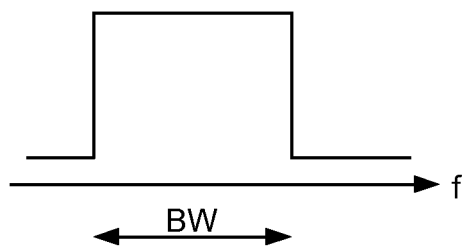
FIG. 1c illustrates an exemplary PSD signature for such a communication mode.

FIG. 1a is an illustration of a signal in frequency domain emanating from an orthogonal frequency division multiplexed (OFDM) communication mode signal, i.e. a power spectral density (PSD), which comprises a multitude of sub-carriers each carrying symbols. The aggregate view of the multitude of sub-carriers in principle form a "box"-shape in the frequency domain with bandwidth BW for the communication mode surrounded by a wide-band noise floor. FIG. 1b illustrates a corresponding view of an OFDM communication mode signal in frequency domain with low traffic and where control and/or synchronization symbols are present for selected sub-carriers, which can be distributed over the bandwidth BW. FIG. 1c illustrates an exemplary PSD signature for an OFDM communication mode. When the PSD of the received signal is correlated with the PSD signature, a fairly good correlation peak is expected if there is a match them between. Thus, the communication mode can be determined, or at least a probability of a present communication mode. Bandwidth BW for an OFDM communication mode can be fairly flexible, and an exemplary bandwidth BW for an OFDM communication mode can be a multiple of 5 MHz, e.g. 10, 15, or 20 MHz. An exemplary communication mode is High Speed OFDM Packet Access called 3GPP LTE (Third Generation Partnership Project Long Term Evolution).

Figure 2A:
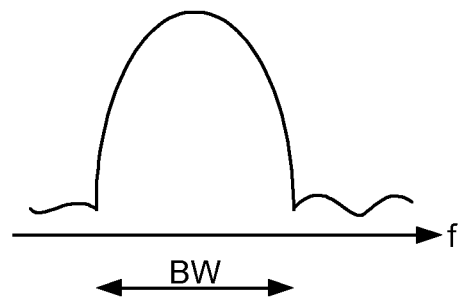
FIG. 2a illustrates an exemplary PSD that a CDMA communication mode may show.
Figure 2B:
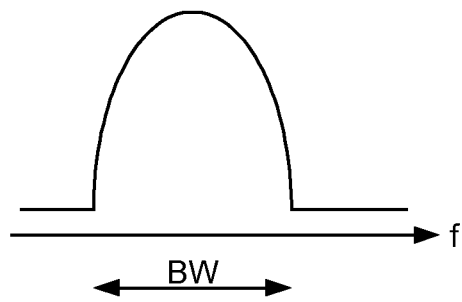
FIG. 2b illustrates an exemplary PSD signature for such a communication mode.

Similar to the illustrations of FIG. 1, FIG. 2a illustrates an exemplary PSD that a CDMA communication mode may show, and FIG. 2b illustrates an exemplary PSD signature for the CDMA communication mode. An exemplary bandwidth BW for a CDMA communication mode can be from about 1 MHz to about 5 MHz depending on communication mode. Exemplary communication modes are CDMA2000 and WCDMA for different frequencies, e.g. UMTS-FDD operating bands I to XIV.

Figure 3A:
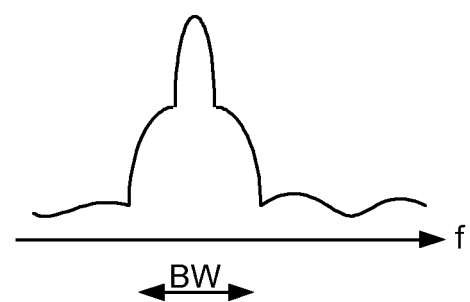
FIG. 3a illustrates an exemplary PSD that a TDMA communication mode may show.
Figure 3B:
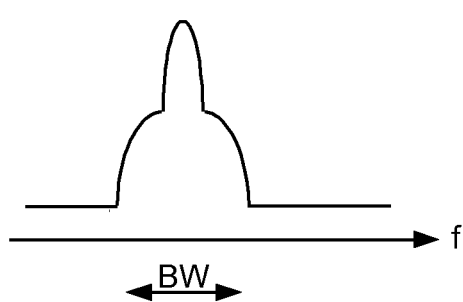
FIG. 3b illustrates an exemplary PSD signature for such a communication mode.

Similar to the illustrations of FIGS. 1 and 2, FIG. 3a illustrates an exemplary PSD that a TDMA communication mode may show, and FIG. 3b illustrates an exemplary PSD signature for such a communication mode. An exemplary bandwidth BW for a TDMA communication mode is 200 kHz. Exemplary communication modes are IS-136 and GSM for different frequencies, e.g. GSM 850, P-GSM 900, E-GSM 900, DCS 1800, PCS 1900.

Figure 4:
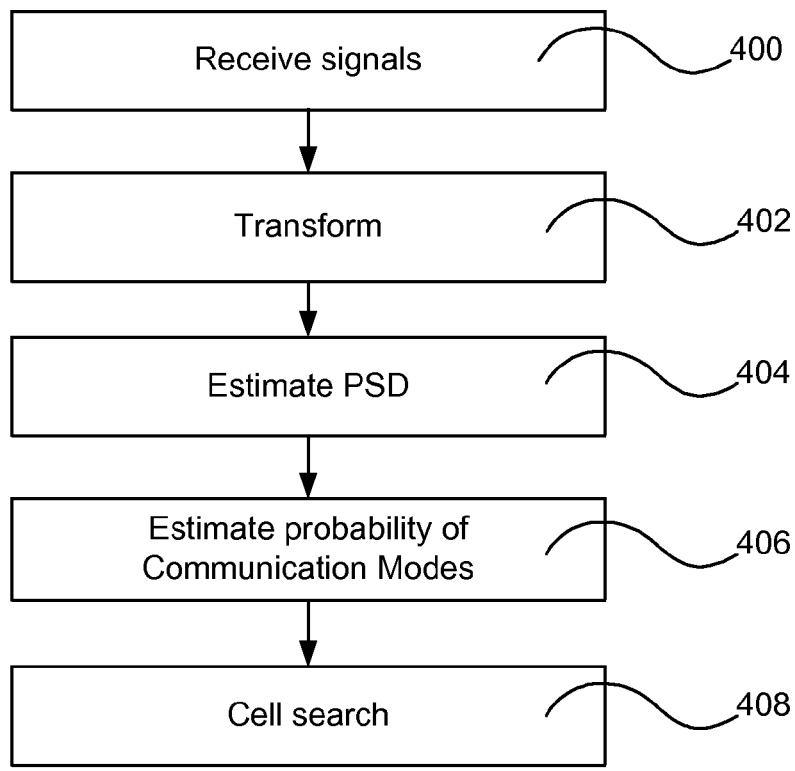
FIG. 4 is a flow chart illustrating a method according to an embodiment of the present invention.

FIG. 4 is a flow chart illustrating a method according to an embodiment of the present invention. In a signal reception step 400, a signal present in a fairly broad spectrum, i.e. within which a desired signal is expected, is received. This fairly broad reception bandwidth can for example be 20 MHz. Even broader reception bandwidths are possible, and an approach for coping with really broad reception bandwidths will be demonstrated with reference to FIG. 13 below, which approach can be utilized in combination with any of the embodiments of this disclosure. Returning to FIG. 4, the received signal can be converted to digital form to enable the further processing of the signal by digital processing means. In a transformation step 402, the received signal is transformed into frequency domain. This can for example be performed by Fast Fourier Transform (FFT), Discrete Fourier Transform (DFT), Discrete Cosine Transform (DCT), or any other suitable transform approach. From the transformed signal, a power spectral density (PSD) of the signal is estimated in a PSD estimation step 404. The estimation can comprise averaging of the signal over time. The estimation can also comprise other filtering, such as smoothening over frequencies. The estimation can also comprise providing a normalised PSD for easier further processing. As a proper PSD of the received signal is established, this is compared with stored PSD signatures of the different communication modes in question in a communication mode probability estimation step 406. The comparison can comprise correlating the PSD with the stored PSD signatures, such that correlation values show peaks where the PSD and any PSD signature match. Based on this, a probability for one or more likely communication modes can be estimated. Thus, cell search is performed in a cell search step 408 based on the estimated probabilities. An approach is to perform cell search on the most probable communication mode. Another approach is to perform cell search on a desired communication mode that has a probability over a certain level. The features described with reference to FIG. 4 are of a general nature of the present invention and applicable to the more specific embodiments below, where the already-above mentioned features are omitted for the sake of conciseness.

Figure 5:
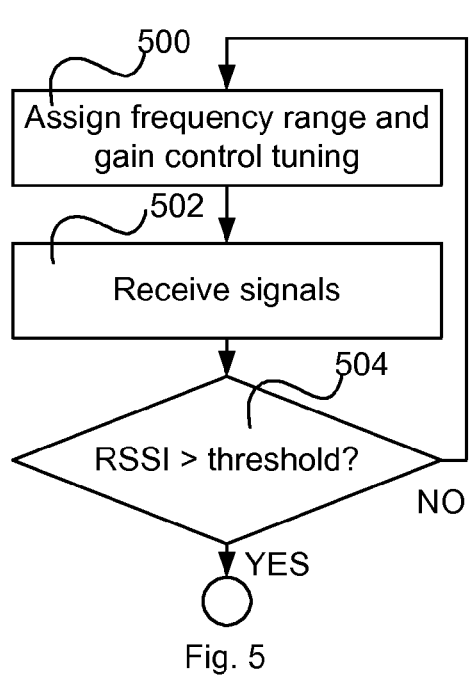
FIG. 5 is a flow chart illustrating a reception procedure according to an embodiment of the present invention.

FIG. 5 is a flow chart illustrating a reception procedure according to an embodiment of the present invention. Reception, e.g. as in step 400 in FIG. 4, can comprise an initial step 500 comprising assigning frequency range of reception of signals, and tuning of gain control for the reception. The signals are then received in a signal reception step 502. Received signal strength indicator (RSSI) is determined for the received signals and compared with a threshold in an RSSI checking step 504. Here, it should be noted that RSSI can be determined for a certain bandwidth, or that several RSSI values may be determined over a certain bandwidth, such as an RSSI scan. In the latter case, the RSSI value can be considered as a vector. If RSSI is below the threshold, i.e. the signal is too weak, the process returns to the initial step 500, where frequency range and gain control may be adjusted before making another attempt to receive proper signals. If RSSI is above the threshold, the processing continues to further processing according to the method of the present invention, i.e. transformation, estimation, etc. The assignment of a threshold value should take account on the way, as demonstrated above, that the RSSI was determined to provide comparable values.

Figure 6:
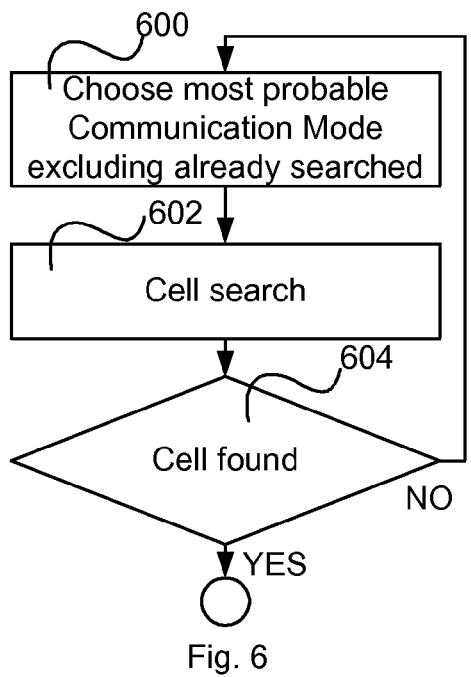
FIG. 6 is a flow chart illustrating a cell search procedure according to an embodiment of the present invention.

FIG. 6 is a flow chart illustrating a cell search procedure according to an embodiment of the present invention. In a choose step 600, a most probable communication mode for being cell searched is chosen from a list of communication modes that have been ranked according to their estimated probability according to what is demonstrated above. Then, in a cell search step 602, cell searching is performed for the chosen communication mode. In a checking step 604, it is checked whether a cell is found during the cell search. If a cell is found, the procedure continues according to the method demonstrated above. If no cell is found, the procedure returns to the choose step 600, where the most probable communication mode is chosen, excluding already searched communication modes. Then that communication mode is cell searched, and the procedure goes on.

Figure 7:
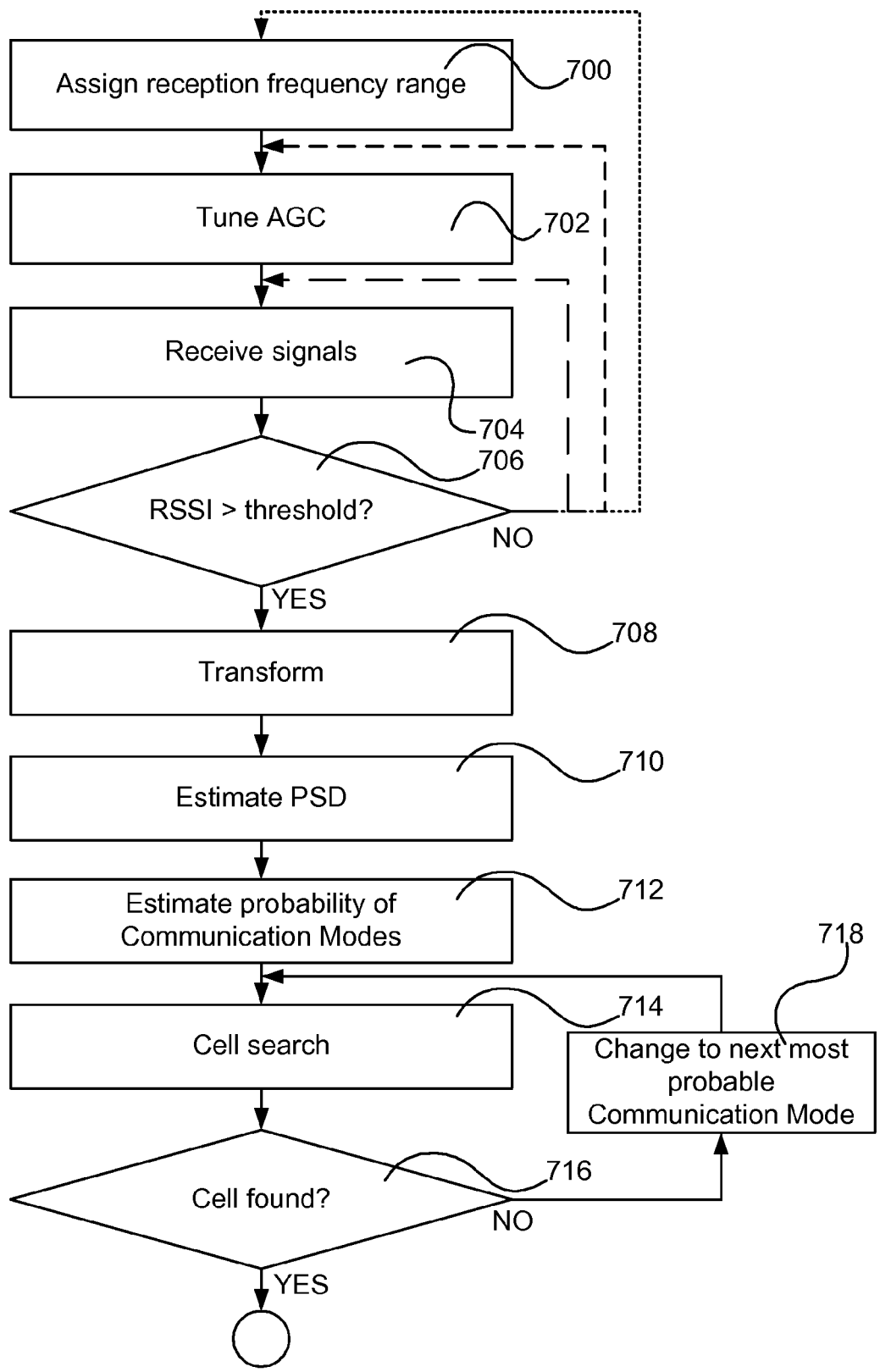
FIG. 7 is a flow chart illustrating a method according to an embodiment of the present invention.

FIG. 7 is a flow chart illustrating a method according to an embodiment of the present invention. The method of FIG. 7 is based on the basic method illustrated in FIG. 4, and therefore, measures that are common for the methods are not disclosed in detail here for the sake of conciseness. Frequency range for reception is assigned in a frequency assignment step 700, and gain control is tuned in automatic gain control (AGC) tuning step 702. Signals are received in a signal reception step 704 with the parameters set in steps 700 and 702. In a signal strength checking step 706, it is checked if RSSI is above a chosen threshold, which for example is chosen from experience. If the RSSI is below the threshold, the method returns to the frequency assignment step 700, alternatively, to the AGC tuning step 702, to set other parameters for reception, or alternatively to the signal reception step 704 to try to receive signals with the same parameters as before. If RSSI is above the threshold, the method continues with a transforming step 708, a PSD estimation step 710, a communication mode probability estimation step 712, and a cell search step 714. In a checking step 716, it is checked whether a cell is found during the cell search. If no cell is found, a communication change step 718 is performed where the communication mode is changed to next most probable communication mode, i.e. the most probable communication mode is chosen, excluding already searched communication modes. Then that communication mode is cell searched in cell search step 714, and the procedure goes on.

Figure 8:
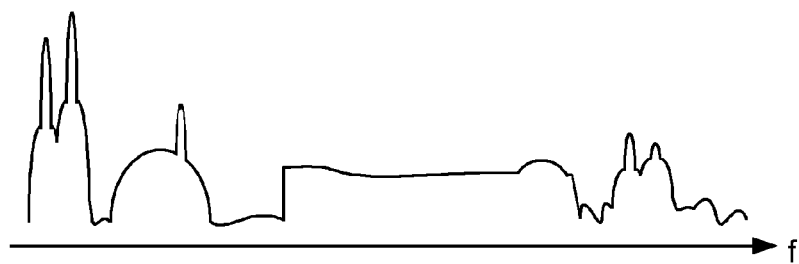
FIG. 8 illustrates an exemplary received signal being transformed to frequency domain.
Figure 9:
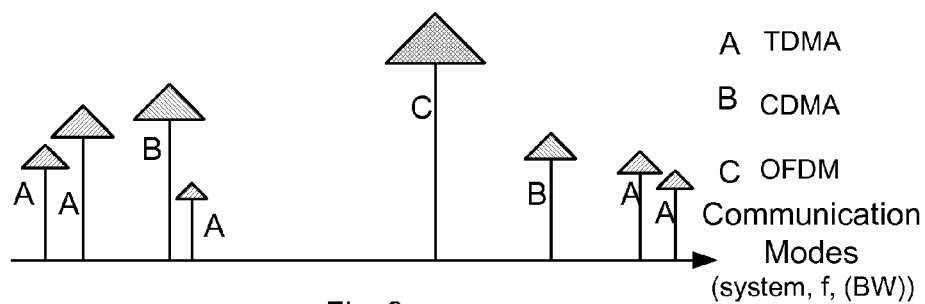
FIG. 9 illustrates an exemplary result of correlation between PSD of received signals to PSD signatures of different communication modes.

FIG. 8 illustrates an exemplary received signal being transformed to frequency domain. This fairly broad reception bandwidth can be received in one go, or, for even broader reception bandwidths, the approach for coping with really broad reception bandwidths as demonstrated with reference to FIG. 13 below can be used to achieve a PSD for the entire aggregated reception bandwidth. Returning to FIG. 8, in the signal, signal patterns with different shapes, bandwidths and signal strengths can be found. These are correlated to PSD signatures according to what is demonstrated above. To make this even more efficient, local peaks can be determined, i.e. good signals believed to hold a feasible communication mode signal, and correlation are done around these peaks. The correlation then gives metrics on best cellular system matches including estimates of carrier frequency for them. Since a shape is correlated, also the used cellular system, e.g. GSM, WCDMA, LTE with its assigned bandwidth, etc., can be determined. From this gained information, the probability of present communication mode(s) can be estimated. For example, FIG. 9 illustrates an exemplary result of correlation between PSD of received signals to PSD signatures of different communication modes. The recognised communication modes of the received signals can thus be assigned what system they work according (TDMA, CDMA, OFDM, ... ), what frequency they are present at, and their assigned bandwidth, where that is applicable. Further parameters can also be assigned when the communication modes are identified, such as signal quality parameters. These correlations, i.e. recognised signals emanating from identified communication modes, can then be ranked and cell search can be performed, beginning with the most probable communication mode.

Figure 10:
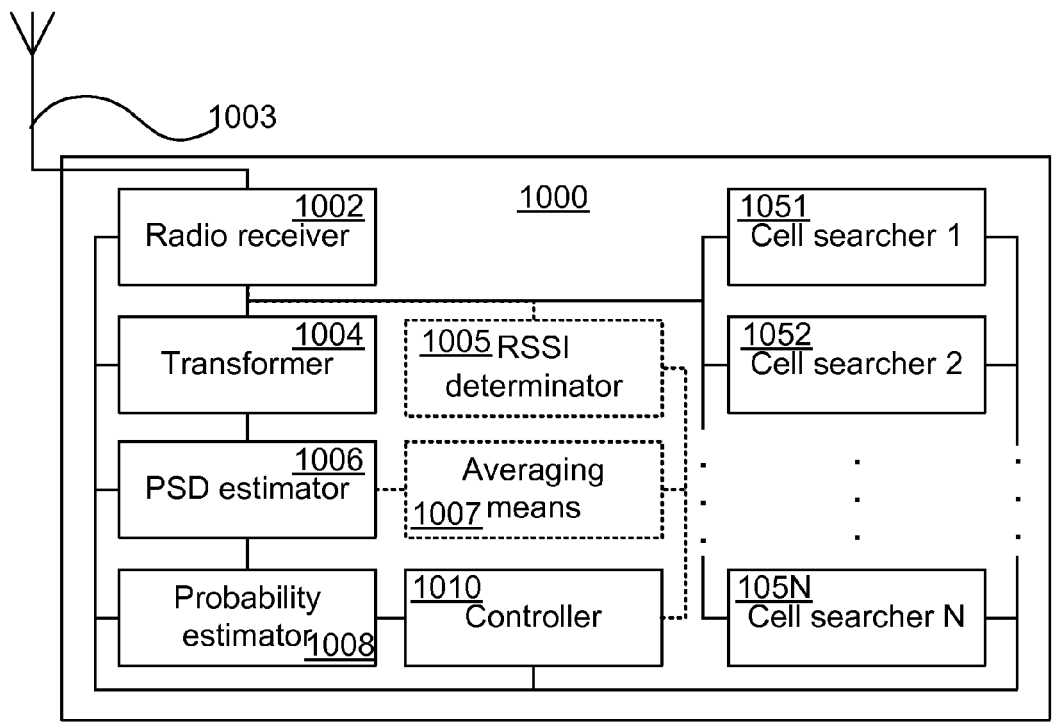
FIG. 10 is a schematic block diagram illustrating a multimode communications apparatus according to an embodiment of the present invention.

FIG. 10 is a schematic block diagram illustrating a multi-mode communications apparatus 1000 according to an embodiment of the present invention. The apparatus 1000 comprises a receiver 1002, which e.g. receives signals through an antenna 1003. The output from the receiver 1002, i.e. the demodulated signals, are provided to both a transformer 1004 and to a number of cell searchers 1051, 1052, . . . , 105N. The signal can also be provided to an optional RSSI determinator 1005 arranged to check if the received signal has suitable strength. The cell searchers should be construed functionally, and are each adapted to perform cell search according to a communication mode. The transformer 1004 is arranged to transform the demodulated, and possibly digitalized, signal to frequency domain, e.g. by FFT, DFT, DCT, or other transform procedure. The transformed signal is provided to a PSD estimator 1006 which estimate PSD of the received signal. To further improve PSD estimation, an optional averaging means 1007 can be connected to the PSD estimator 1006 to average over time, e.g. over a few symbols, or average in frequency to smoothen the shape of the PSD of the received signal. This may facilitate probability estimation, which is performed by a probability estimator 1008. The probability estimator 1008 can comprise a correlator or other comparison means which compares the PSD of the received signal with PSD signatures of possible communication modes. The most probable communication mode, or a list with the communication modes ranked according to probability is provided to a controller 1010, which from this information by its control assigns the proper cell searcher 1051, 1052, . . . , 105N. The controller 1010 preferably also control the other elements 1002, 1004, 1005, 1006, 1007, 1008 of the apparatus 1000. It should be noted that the elements 1002, 1004, 1005, 1006, 1007, 1008, 1010, 1051, 1052, . . . , 105N should be construed functionally, and many of the functions can be implemented in one or more processors that with aid of software perform the functions. The processor can be adapted to control reception according to the approach demonstrated with reference to FIG. 13 for providing a really broadband view of available communication modes. The multi-mode communications apparatus 1000 can be a portable communication apparatus, such as a mobile phone, or other communication apparatus with comparable abilities.

Figure 11:
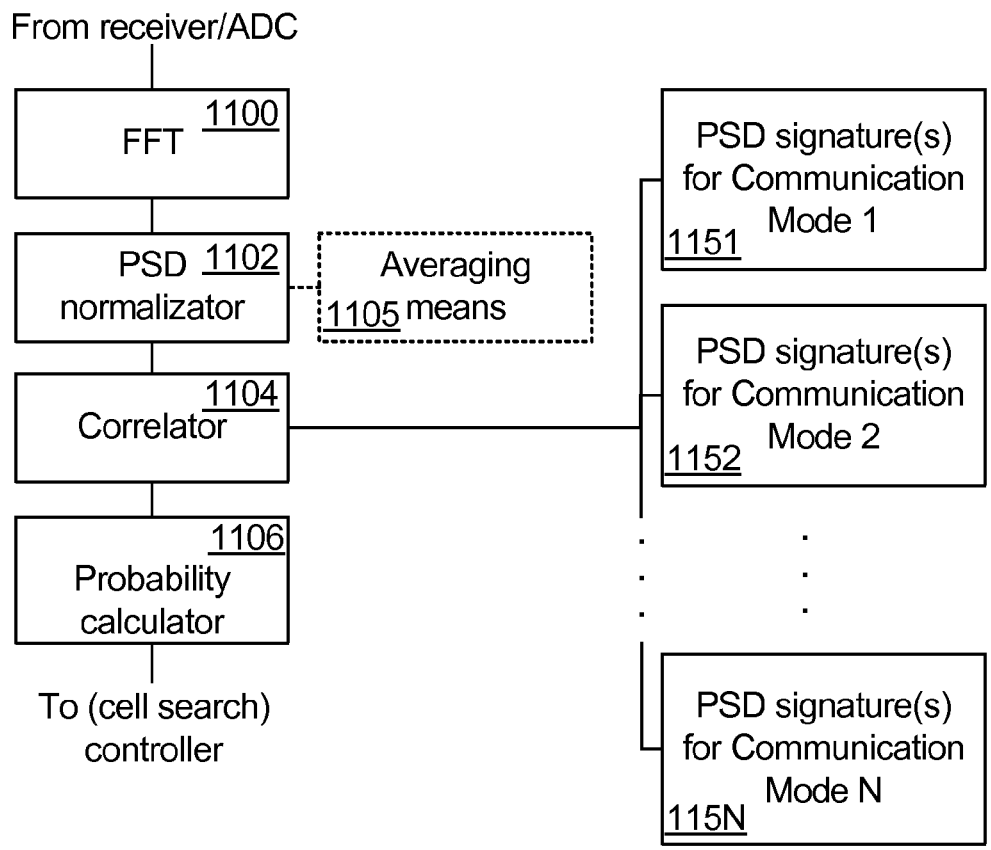
FIG. 11 is a schematic block diagram illustrating communication mode identifying means according to an embodiment of the present invention.

FIG. 11 is a schematic block diagram illustrating communication mode identifying means according to an embodiment of the present invention. A demodulated, and possibly digitalized, signal is provided to a transforming means 1100, e.g. an FFT, which is arrange to transform the signal into frequency domain. The transformed signal is provided to a PSD normalizer 1102, i.e. a signal processor that puts the transformed signal into a shape that is easily compared with PSD signatures 1151, 1152, . . . , 115N, in a comparison means 1104, e.g. a correlator. The PSD normalizer can be helped by an optional averaging means 1105 arranged to average over time, e.g. over some symbols in time, and/or over frequency to smoothen the spectrum shape of the signal. The comparison result of the comparison means 1104 is provided to a probability calculator 1106 which gives a probability of different communication modes, either by just pointing out the most probable communication mode, or providing a list with ranked communication modes according to their probabilities, or giving figures on probability for the communication modes. The probability information given by the probability calculator is provided to a controller controlling assignment of cell searcher.

Figure 12:
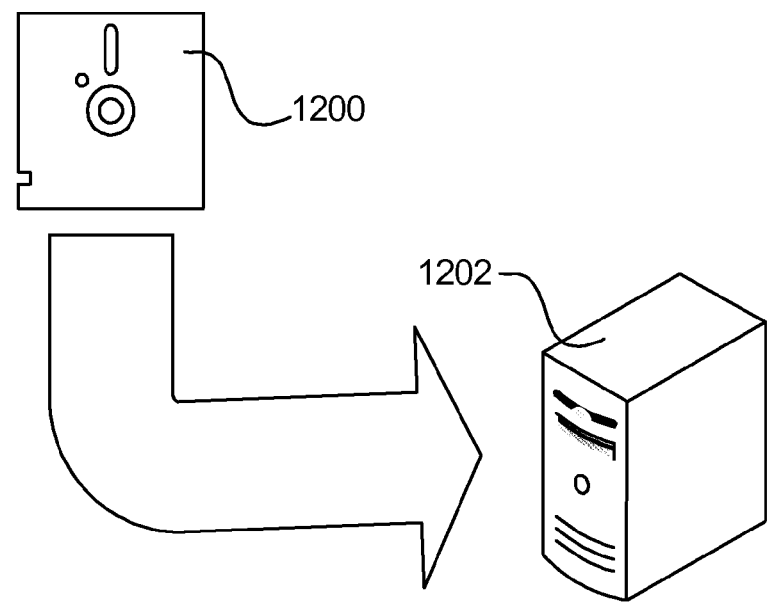
FIG. 12 is a schematic illustration of a computer readable medium according to an embodiment of the present invention.

FIG. 12 is a schematic illustration of a computer readable medium according to an embodiment of the present invention. As discussed above, the apparatus is implementable with hardware in an apparatus with aid of software. Thus, the cell searching function is suitable for implementation with aid of processing means, such as general, signal, and/or image processors. The computer program preferably comprises program code, as illustrated in FIG. 12, which is stored on a computer readable medium 1200, which can be loaded and executed by a processing means 1202 to cause it to perform the above described method comprising receiving signals present in a frequency range, transforming received signals into frequency domain, estimating power spectral density from transformed signals, estimating probability of different communication modes by correlating the estimated power spectral density with power spectral density signatures of said different communication modes, and performing cell search according to estimated most probable communication mode.

The program code can further cause the processing means to perform ranking said different communication modes according to their estimated probability, and if no cell search match is found on the most probable communication mode, performing cell search for the other different communication modes in order of decreasing probability until a cell search match is found. The program code can further cause the processor to perform averaging over a time corresponding to a predetermined number of expected symbols for any of the communication modes, and/or averaging over a predetermined number of expected carriers for any of the communication modes.

The program code can also be arranged to determine received signal strength indicator, RSSI, for the received signals such that if the RSSI is below a predetermined threshold the receiving of signals is continuing until the RSSI becomes above the predetermined threshold before performing said transforming, estimating power spectral density, estimating probability, and cell searching, and/or determine frequencies holding peaks of power, wherein said correlation of estimated power spectral density with power spectral density signatures of said different communication modes is performed for frequency values on and in vicinity of said frequencies holding peaks of power. The program code can also be adapted to control reception according to the approach demonstrated below with reference to FIG. 13. The program can also be adapted such that cell search according to estimated most probable communication mode is performed on and in vicinity of said frequencies holding peaks of power. The processing means 1202 and computer program product 1200 can be arranged to execute the program code sequentially where actions are performed stepwise, but mostly be arranged to execute the program code on a real-time basis where actions are performed upon need and availability of data. The processing means 1202 is preferably what normally is referred to as an embedded system. Thus, the depicted computer readable medium 1200 and processing means 1202 in FIG. 12 should be construed to be for illustrative purposes only to provide understanding of the principle, and not to be construed as any direct illustration of the elements.

Figure 13:
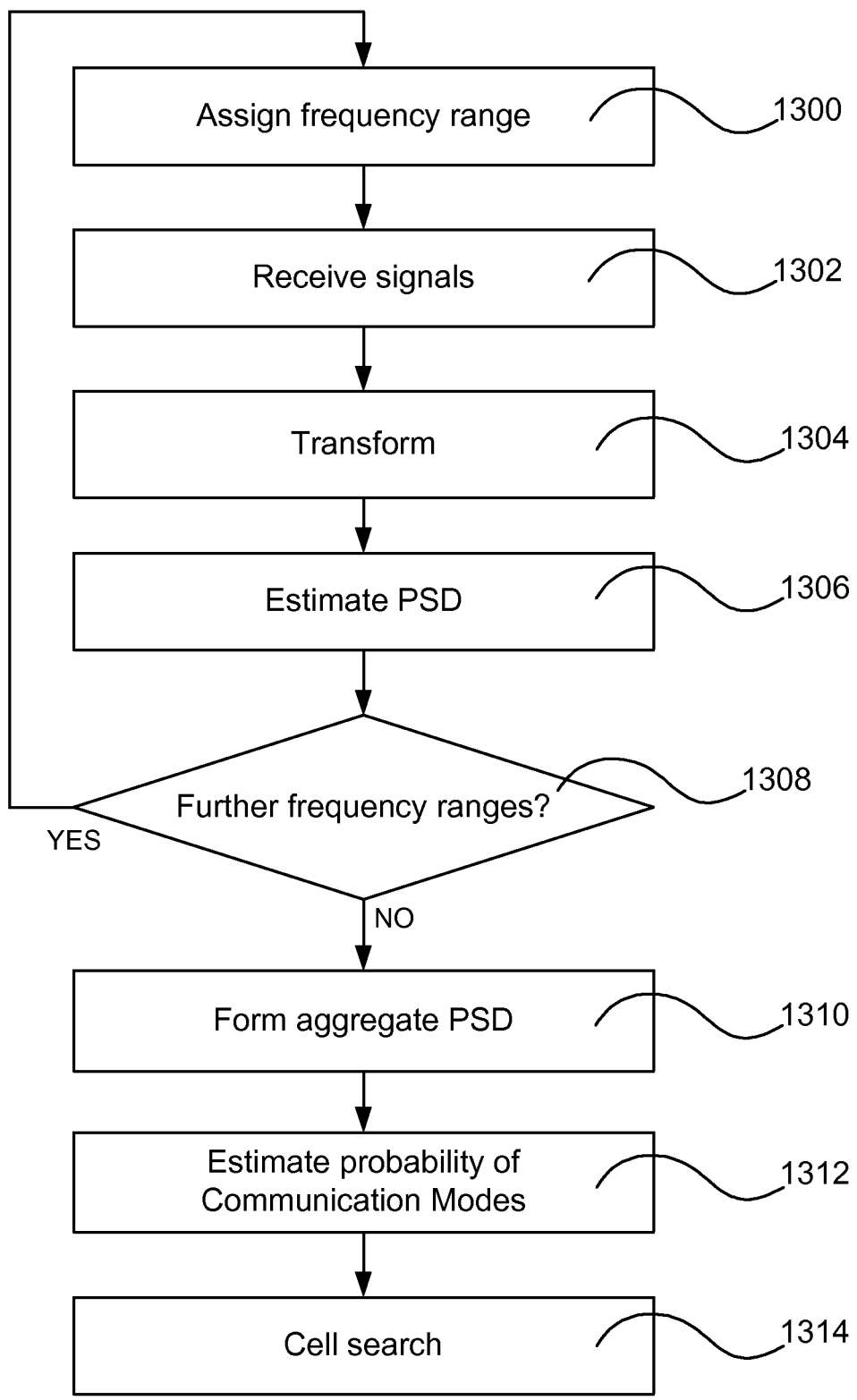
FIG. 13 is a flow chart illustrating a method according to an embodiment of the present invention where the total desired or possible frequency range is received in several sub-ranges.

FIG. 13 is a flow chart illustrating a method according to an embodiment of the present invention where the total desired or possible frequency range is received in several sub-ranges. In a frequency range assignment step 1300, a frequency range is set. In a signal reception step 1302, a signal present in the set frequency range is received. The received signal can be converted to digital form to enable the further processing of the signal by digital processing means. In a transformation step 1304, the received signal is transformed into frequency domain. This can for example be performed by Fast Fourier Transform (FFT), Discrete Fourier Transform (DFT), Discrete Cosine Transform (DCT), or any other suitable transform approach. From the transformed signal, a power spectral density (PSD) of the signal is estimated in a PSD estimation step 1306. The estimation can comprise averaging of the signal over time. The estimation can also comprise other filtering, such as smoothening over frequencies. The estimation can also comprise providing a normalised PSD for easier further processing. Then in a checking step 1308, it is determined if further frequency ranges should be received. If further frequency ranges are to be received, the process returns to frequency assignment step 1300 where next frequency range is set, and then the procedure of steps 1302, 1304 and 1306 is repeated for that next frequency range. Thus, a number of PSD can be formed in an aggregate PSD forming step 1310.

As a proper aggregate PSD of the received signal is established, this is compared with stored PSD signatures of the different communication modes in question in a communication mode probability estimation step 1312. The comparison can comprise correlating the aggregate PSD with the stored PSD signatures, such that correlation values show peaks where the PSD and any PSD signature match. It should be noted that it is not essential to form an aggregate PSD, and the comparison can be based on comparison with each of the PSDs of the different frequency ranges, or the PSDs of the frequency ranges could be grouped in any appropriate way, e.g. where the total frequency range of aggregated sub-ranges is not continuous, and then comparison is performed. Based on this, a probability for one or more likely communication modes can be estimated. Thus, cell search is performed in a cell search step 1314 based on the estimated probabilities. An approach is to perform cell search on the most probable communication mode. Another approach is to perform cell search on a desired communication mode that has a probability over a certain level.

The invention claimed is:

1. A cell search method for a multi-mode telecommunication apparatus, the method comprising:
   receiving signals present in a frequency range;
   transforming received signals into frequency domain;
   estimating power spectral density from transformed signals;
   estimating probability of different communication modes by correlating the estimated power spectral density with power spectral density signatures of said different communication modes;
   performing cell search according to estimated most probable communication mode;
   ranking said different communication modes according to their estimated probability;
   if no cell search match is found on the most probable communication mode, performing cell search for the other different communication modes in order of decreasing probability; and
   basing performance of the method on a comparison of a received signal strength indicator, RSSI, with a predetermined threshold.

2. The method according to claim 1, wherein said estimation of power spectral density from transformed signals comprises averaging over a time corresponding to a predetermined number of expected symbols for any of the communication modes.

3. The method according to claim 2, wherein said estimation of power spectral density from transformed signals further comprises averaging over a predetermined number of expected carriers for any of the communication modes.

4. The method according to claim 1, further comprising determining the RSSI for the received signals.

5. The method according to claim 4, further comprising wherein basing performance of the method on a comparison of the received RSSI with the predetermined threshold comprises:
   continuing the receiving of signals, if the RSSI is below a predetermined threshold, until the RSSI becomes above the predetermined threshold before performing said transforming, estimating power spectral density, estimating probability, and cell searching.

6. The method according to claim 4, further comprising determining frequencies holding peaks of power, wherein said correlation of estimated power spectral density with power spectral density signatures of said different communication modes is performed for frequency values on and in vicinity of said frequencies holding peaks of power.

7. The method according to claim 6, wherein said cell search according to estimated most probable communication mode is performed on and in vicinity of said frequencies holding peaks of power.

8. A multi-mode telecommunication apparatus comprising:
   a radio receiver arranged to receive signals present in a frequency range;
   a transformer means arranged to transform signals received by the radio receiver into frequency domain;
   a power spectral density estimator arranged to estimate power spectral density of signals transformed by the transformer;
   a probability estimator arranged to estimate probability of different communication modes, said probability estimator comprising a correlator arranged to correlate the estimated power spectral density with power spectral density signatures of said different communication modes;
   a plurality of cell searchers, each arranged to perform cell searching for a communication mode; and
   a controller arranged to assign the one of said plurality of cell searchers to perform cell search according to the estimated most probable communication mode,
   wherein the controller is further arranged to:
   rank said different communication modes according to their estimated probability;
   if no cell search match is found on the most probable communication mode, assign another of said plurality of cell searchers to perform cell search for another of the different communication modes in order of decreasing probability; and
   base operation of the controller on a comparison of a received signal strength indicator, RSSI, with a predetermined threshold.

9. The apparatus according to claim 8, wherein said power spectral density estimator comprises averaging means arranged to provide an average over a time corresponding to a predetermined number of expected symbols for any of the communication modes.

10. The apparatus according to claim 9, wherein said averaging means further is arranged to average over a predetermined number of expected carriers for any of the communication modes.

11. The apparatus according to claim 8, further comprising RSSI determination means arranged to provide RSSI for the received signals.

12. The apparatus according to claim 11, wherein the controller is arranged to control the receiving of signals to continue, if the RSSI is below a predetermined threshold, until the RSSI becomes above the predetermined threshold before activating said transformer, power spectral density estimator, probability estimator, and any of the cell searchers.

13. The apparatus according to claim 11, wherein the controller is further arranged to determine frequencies holding peaks of power, such that said correlator is controlled to perform said correlation of estimated power spectral density with power spectral density signatures of said different communication modes for frequency values on and in vicinity of said frequencies holding peaks of power.

14. The apparatus according to claim 13, wherein said assigned cell searcher controlled to perform cell searching according to estimated most probable communication mode is controlled to perform cell searching on and in vicinity of said frequencies holding peaks of power.

15. A non-transitory computer readable storage medium having stored therein instructions, which when executed by a processor cause the processor to perform a cell search method for a multi-mode telecommunication apparatus, the method comprising:
   receiving signals present in a frequency range;
   transforming received signals into frequency domain;
   estimating power spectral density from transformed signals;
   estimating probability of different communication modes by correlating the estimated power spectral density with power spectral density signatures of said different communication modes;
   performing cell search according to estimated most probable communication mode;
   ranking said different communication modes according to their estimated probability;
   if no cell search match is found on the most probable communication mode, performing cell search for the other different communication modes in order of decreasing probability; and
   basing performance of the method on a comparison of a received signal strength indicator, RSSI, with a predetermined threshold.

* * * * *